(No Model.)
G. N. SCEETS.
CAR AXLE JOURNAL BEARING.
No. 447,527. Patented Mar. 3, 1891.
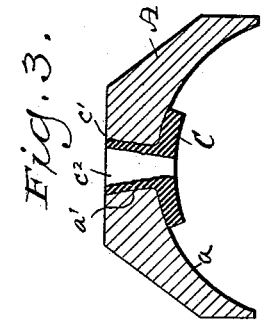
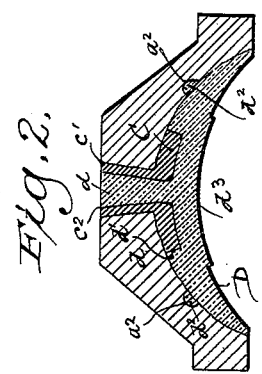
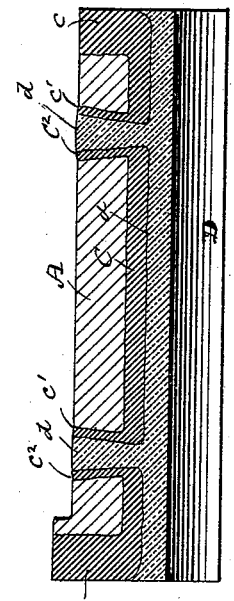
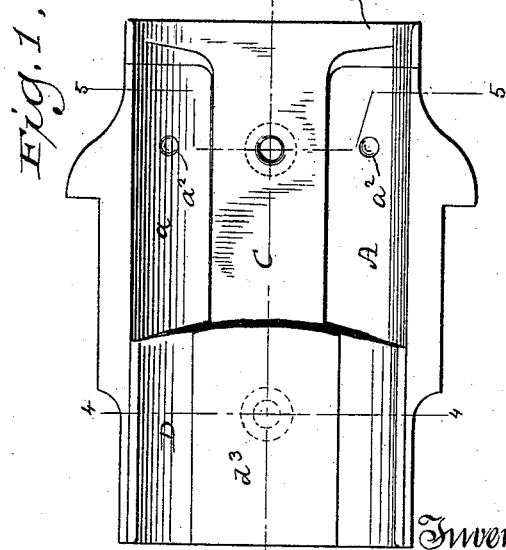
Witnesses
Geo. W. Young
Jas. L. Coudon
Inventor
George N. Sceets
By H. G. Underwood
Attorney

UNITED STATES PATENT OFFICE.

GEORGE N. SCEETS, OF MILWAUKEE, WISCONSIN, ASSIGNOR TO THE MILWAUKEE BRASS AND COPPER WORKS, OF SAME PLACE.

CAR-AXLE JOURNAL-BEARING.

SPECIFICATION forming part of Letters Patent No. 447,527, dated March 3, 1891.

Application filed October 24, 1890. Serial No. 369,207. (No model.)

*To all whom it may concern:*

Be it known that I, GEORGE N. SCEETS, a citizen of the United States, and a resident of Milwaukee, in the county of Milwaukee, and in the State of Wisconsin, have invented certain new and useful Improvements in Car-Axle Journal-Bearings; and I do hereby declare that the following is a full, clear, and exact description thereof.

My invention relates to journal-bearings for car-axles and the like; and it consists in certain peculiarities of construction, as will be fully set forth hereinafter and subsequently claimed.

In the drawings, Figure 1 is an under side plan view of a journal-bearing embodying my invention, the Babbitt lining on the same being partially removed. Fig. 2 is a cross-section on the line 4 4 of Fig. 1. Fig. 3 is an irregular cross-section on the line 5 5 of Fig. 1. Fig. 4 is a central longitudinal section on the line 6 6 of Fig. 1.

In carrying my invention into effect I first produce a journal-frame or backing of malleable iron by the usual casting operation, providing, however, tapered cores, which form corresponding inwardly-tapered apertures through the body of the backing. I now form a matrix corresponding, essentially, to the form of the bearing-surface of this backing, but of greater length than the backing and place the backing, preferably in heated condition, into the said matrix, so that a space shall intervene between the convex upper surface of the matrix and the adjacent concave bearing-surface of the backing, and also between the ends of the matrix and those of the backing. I now pour the melted lining metal through the tapered apertures of the backing, so that the spaces before described, as well as the apertures, shall be filled with the lining metal. Thus when the casting is completed and the lining metal has set, the concave side of the backing will be found covered with a similarly-shaped lining of anti-friction metal, usually brass, and the ends of said backing will also be covered with facings integral with the lining metal. Furthermore, it will be found that the lining and facings have been securely attached to the backing by the metal which has filled the apertures in the backing.

In certain instances I so form the matrix into which the backing is to be inserted as to leave only a central longitudinal space between the convex surface of the matrix and the concave surface of the backing, thus forming only a longitudinal rib of metal on the bearing-surface of the backing and uniting the integral end facings. This variation is the one illustrated in the drawings, and it will be understood that the method of making my journal-bearings is otherwise the same, whether the concave surface of the backing is wholly or only partially covered by the brass or other metal cast thereon. It will thus be seen that I not only produce an inexpensive form of backing, but also simultaneously with the formation of the lining and facings or rib and facings attach the same to the backing and avoid all necessity of riveting or otherwise similarly connecting said parts to the backing.

Referring to the drawings, A designates the backing, which is of semi-cylindrical form to fit within the upper part of a car-axle box or similar structure. This backing is, as above stated, cast of malleable iron with a concave bearing-surface $a$. The said backing is also of less length than the bearing-surface of the axle which it is to receive. Through the body of this backing are formed two or more apertures $a'$, which are formed, as aforesaid, by cores, and which are of gradually-diminishing diameter from their inner ends to their outer ends, as shown. In the illustration given, instead of entirely covering the concave surface $a$ of this backing with the anti-friction metal, the convex surface of the matrix into which the backing is placed is formed with a central longitudinal depression, which, when the metal is poured through the apertures $a'$, forms a longitudinal rib C, extending centrally of the concave surface of the bearing and united integrally to the end facings $c$ of the bearing. These apertures $a'$ are filled with the poured metal, forming tapered keys $c'$, which are integral with the rib C, and which secure the rib and facings $c$ to the backing, and the said keys $c'$ themselves are hollow, being formed each with an inwardly-tapered bore $c^2$, produced by coring, as before. Before these bearings are complete for service they are placed again in a suitable matrix, concave side downward, and melted Babbitt metal is poured in through the bores $c^2$ of the keys $c'$, thus forming a Babbitt lining D, which completely covers the concave surface $a$ of the backing, as well as the rib C, the metal which remains in the bores $c^2$ of the keys $c'$ forming in turn tapered keys $d$, which firmly secure the lining D in position. This lining D preferably does not extend over the facings $c$ of the rib C, although it may of course do so, if preferred. As thus produced, the Babbitt lining D forms shoulders $d'$, which embrace the sides of the rib C and assist in retaining the lining D against lateral displacement by the revolutions of the axle, and this result is also further insured by forming cavities or depressions $a^2$ in the concave surface of the backing A at opposite sides of the rib C, into which cavities the lining D flows and sets in the form of offsets $d^2$. The lining D is also preferably formed with a central longitudinal rib $d^3$, which takes the direct wear of the axle, and thus prolongs the life of the lining. It is to be observed that the length of the lining as defined by the outer surfaces of the facings $c$ corresponds approximately with the length of the bearing-surface of the axle, the inner surfaces of the heads and shoulders of the axle abutting against the facings $c$.

From the above description it will be seen that I have devised bearings which in themselves are very durable, and are also inexpensive as to manufacture and as to the materials which constitute their component parts.

Having thus described my invention, what I claim as new, and desire to secure by Letters Patent, is—

An improved journal-bearing comprising a metal backing-piece having inwardly-tapered apertures extending through its body, a mass of metal cast upon the concave side of the bearing, and having hollow internally-tapered integral portions extending into said apertures and forming keys, and an outer mass of bearing metal having integral portions cast within the bores of said keys, substantially as set forth.

In testimony that I claim the foregoing I have hereunto set my hand, at Milwaukee, in the county of Milwaukee and State of Wisconsin, in the presence of two witnesses.

GEORGE N. SCEETS.

Witnesses:
H. G. UNDERWOOD,
WM. KLUG.